(12) United States Patent
Takamizawa et al.

(10) Patent No.: US 7,963,703 B2
(45) Date of Patent: Jun. 21, 2011

(54) THRUST ROLLER BEARING

(75) Inventors: Wataru Takamizawa, Oume (JP); Hiroshi Sato, Hamura (JP); Kanji Kawasaki, Oume (JP); Masaki Toyama, Oume (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 500 days.

(21) Appl. No.: 11/826,642

(22) Filed: Jul. 17, 2007

(65) Prior Publication Data
US 2008/0019627 A1 Jan. 24, 2008

(30) Foreign Application Priority Data
Jul. 18, 2006 (JP) ................. P2006-195511

(51) Int. Cl.
*F16C 19/30* (2006.01)
*F16C 19/54* (2006.01)
*F16C 33/46* (2006.01)

(52) U.S. Cl. ......... 384/618; 384/455; 384/621; 384/623

(58) Field of Classification Search .................. 384/296, 384/420, 455, 548, 569, 572–573, 580, 618, 384/621, 623
See application file for complete search history.

(56) References Cited

U.S. PATENT DOCUMENTS

| | | | |
|---|---|---|---|
| 1,523,531 A | 1/1925 | Ettore Bugatti | |
| 3,240,542 A * | 3/1966 | Rudolf | 384/623 |
| 4,192,560 A * | 3/1980 | Hartnett | 384/572 |
| 4,821,857 A * | 4/1989 | Groh | 192/45 |
| 5,938,349 A * | 8/1999 | Ogawa | 384/615 |
| 6,106,158 A * | 8/2000 | Hayashi et al. | 384/623 |
| 2006/0120646 A1* | 6/2006 | Suzuki | 384/470 |
| 2006/0140527 A1* | 6/2006 | Takamizawa et al. | 384/620 |

FOREIGN PATENT DOCUMENTS

| | | |
|---|---|---|
| DE | 7030106 | 11/1970 |
| GB | 1348429 | 8/1971 |
| JP | 6-337016 | 12/1994 |
| JP | 7-332357 | 12/1995 |
| JP | 2000-170773 A | 6/2000 |
| JP | 2002-250347 | 9/2002 |
| JP | 2006-22847 | 1/2006 |
| JP | 2006-170370 | 6/2006 |

OTHER PUBLICATIONS

European Search Report dated Nov. 13, 2007.
English translation of Decision of Refusal for corresponding Japanese Patent Application No. 2006-195511 dated Aug. 26, 2010.
Translation of Japanese Office Action dated Jun. 9, 2010.

\* cited by examiner

*Primary Examiner* — Marcus Charles
(74) *Attorney, Agent, or Firm* — McGuinn IP Law PLLC

(57) ABSTRACT

A thrust roller bearing including: a pair of races each of which has an annular plate; a cage interposed between the pair of races, formed by a single annular plate including a bent portion bent in an intermediate region in a radial direction of the cage such that a plurality of projecting portions to project in a thickness direction of the cage are formed on a first side and a second side of the cage, and a plurality of pockets stamped out in the thickness direction at predetermined intervals in a circumferential direction of the cage; and a plurality of rollers received respectively in the pockets. At least two projecting portions are formed on each of the first side and the second side of the cage; and a plurality of race-contacting projection portions are arranged on a surface of at least one of the two projecting portions on at least one of the first side and the second side of the cage at predetermined intervals in the circumferential direction of the cage.

9 Claims, 5 Drawing Sheets

THRUST ROLLER BEARING

BACKGROUND OF THE INVENTION

1. Field of the Invention

This invention relates to a thrust roller bearing, and more particularly to a thrust roller bearing in which a shearing resistance due to the viscosity of oil between a cage and races is reduced, thereby reducing a rotation torque.

2. Related Art

At present, the environment is much affected by automobiles, and therefore it is an important problem to achieve a low fuel consumption design. In an automatic transmission, ten or more thrust roller bearings are used on the average, and with respect to such thrust roller bearings, also, attempts have been made to achieve a low torque design in order that the reduction of a rotation torque can contribute to the low fuel consumption design.

As means for achieving the low torque design, there have been proposed a system in which an end surface of each roller and an end surface of a pocket of a cage are disposed in point-contact with each other, a double-row arrangement of rollers, etc.

A conventional thrust roller bearing including a pair of first and second races of an annular shape having their respective raceway surfaces opposed to each other, a plurality of rollers disposed between the two races and arranged at intervals in a circumferential direction, and an annular cage for holding and guiding the rollers.

The first race has an axially-extending cylindrical flange formed at its outer periphery by bending, and an inner peripheral portion of the first race is flush with the flat raceway surface. The second race is merely formed into a flat plate-shape, and is received in the first race.

The cage for holding and guiding the rollers (which are disposed between the raceway surfaces of the first and second races, and roll on the raceway surfaces while receiving a load) has a generally M-shaped cross-section, and has a plurality of pockets formed by stamping and arranged at predetermined intervals in the circumferential direction. The rollers are received in the pockets, respectively.

Thus, the cage has the generally M-shaped cross-section, and with this construction the rigidity of the cage is increased, and a large load capacity is secured while achieving a compact design of the thrust bearing (see, for example, JP-A-7-332357 Publication).

The cage of the above conventional thrust roller bearing has the generally M-shaped cross-section, and an inner peripheral portion and an outer peripheral portion of the cage fully contact the raceway surface of the first race, and a central portion of the cage disposed between the inner and outer peripheral portions thereof does not contact the second race, and the rollers received in the respective pockets contact the second race. Therefore, the inner and outer peripheral portions of the cage thus fully contact the raceway surface of the first race, and therefore there has been encountered a problem that a rotation torque is increased by a shearing resistance due to the viscosity of oil.

And besides, in the case where the cage of the thrust roller bearing has a generally inverted M-shaped cross-section, a central portion of the cage fully contacts the raceway surface of the first race, and an inner peripheral portion and an outer peripheral portion of the cage do not contact the second race, and the rollers received in the respective pockets contact the second race. In this case, thus, the central portion of the cage fully contacts the raceway surface of the first race, which has also invited a problem that a rotation torque is increased by a resistance offered by the viscosity of oil.

SUMMARY OF THE INVENTION

This invention has been made in order to solve these problems, and an object of the invention is to provide a thrust roller bearing in which full contact between a cage and races is eliminated so as to reduce a shearing resistance due to the viscosity of oil between the cage and the races, thereby reducing a rotation torque.

According to one aspect of the present invention, there is provided a thrust roller bearing including: a pair of races each of which has an annular plate;

a cage interposed between the pair of races, formed by a single annular plate including a bent portion bent in an intermediate region in a radial direction of the cage such that a plurality of projecting portions to project in a thickness direction of the cage are formed on a first side and a second side of the cage, and a plurality of pockets stamped (blanked) out in the thickness direction at predetermined intervals in a circumferential direction of the cage; and a plurality of rollers received respectively in the pockets;

where the at least two projecting portions are formed on each of the first side and the second side of the cage; and a plurality of race-contacting projection portions are arranged on a surface of at least one of the at least-two projecting portions on at least one of the first side and the second side of the cage at predetermined intervals in the circumferential direction of the cage.

Furthermore, the race-contacting projection portions are convex portions formed by punching (pressing) part of the projecting portion or protruding portions formed by notching part of an end portion of the projecting portion.

Furthermore, one of the at least two projecting portions of the bent portion on one of the first side and the second side of the cage is projected in an amount larger than the amount of projecting of the other projecting portion in stepped relation thereto to provide a race-contacting projection portion.

According to another aspect of the invention, there is provided a thrust roller bearing including:

a pair of races each of which has an annular plate;

a cage interposed between the pair of races, formed by a single annular plate including a bent portion bent in an intermediate region in a radial direction of the cage such that a plurality of projecting portions to project in a thickness direction of the cage are formed on a first side and a second side of the cage, and a plurality of pockets stamped out in the thickness direction at predetermined intervals in a circumferential direction of the cage; and a plurality of rollers received respectively in the pockets;

where the at least two projecting portions are formed on each of the first side and the second side of the cage; and where a plurality of cage-contacting projection portions are arranged on a surface of at least one of the pair of races at predetermined intervals along a circumferential direction of the races.

The cage-contacting projection portions are convex portions.

As described above, in the thrust roller bearing of the invention, when the thrust roller bearing is assembled in such a manner that the cage having the rollers received in the pockets is interposed between the pair of races, the race-contacting projection portions formed on at least one of the two projecting portions on at least one of the first side and second side of the cage abut against an inner surface (raceway surface) of the corresponding race, and peripheral surfaces of the rollers received in the respective pockets of the cage contact the inner surfaces of the pair of races. Thus, the inner surface of the race does not fully contact the projecting portion of the cage having the race-contacting projection portions, and instead only the plurality of race-contacting projection portions contact the race. Therefore, a shearing resistance due to the viscosity of oil between the cage and the race is reduced, so that a rotation torque can be reduced.

Furthermore, the race-contacting projection portions are the convex portions formed by punching part of the projecting portion or the protruding portions formed by notching part of the end portion of the projecting portion, and therefore the race-contacting projection portions can be easily formed on the race-contacting surface of the projecting portion of the cage.

Furthermore, one of two or more projecting portions of the bent portion on one of the first side and the second side of the cage is projected in an amount larger than the amount of projecting of the other projecting portion in stepped relation thereto to provide the race-contacting projection portion. Therefore, the race-contacting projection portion can be easily formed by providing the two projecting portions of different projecting amounts.

Furthermore, in the thrust roller bearing of the invention, the plurality of cage-contacting projection portions are formed on a surface of at least one of the pair of races, and are arranged at predetermined intervals in the circumferential direction. Therefore, when the thrust roller bearing is assembled in such a manner that the cage having the rollers received in the respective pockets is interposed between the pair of races, the plurality of cage-contacting projection portions (formed on at least one of the pair of races) abut against a race-contacting surface of the corresponding projecting portion of the cage, and peripheral surfaces of the rollers received in the respective pockets of the cage contact inner surfaces of the pair of races. Thus, the inner surface of the race having the cage-contacting projection portions does not fully contact the corresponding projecting portion of the cage, and instead only the plurality of cage-contacting projection portions contact the race-contacting surface of the projecting portion of the cage. Therefore, a shearing resistance due to the viscosity of oil between the cage and the race is reduced, so that a rotation torque can be reduced.

Furthermore, the cage-contacting projection portions are convex portions, and therefore can be easily formed on the cage-contacting surface of the race.

DETAILED DESCRIPTION OF THE PREFERRED EMBODIMENTS

First Embodiment

Figure 1:
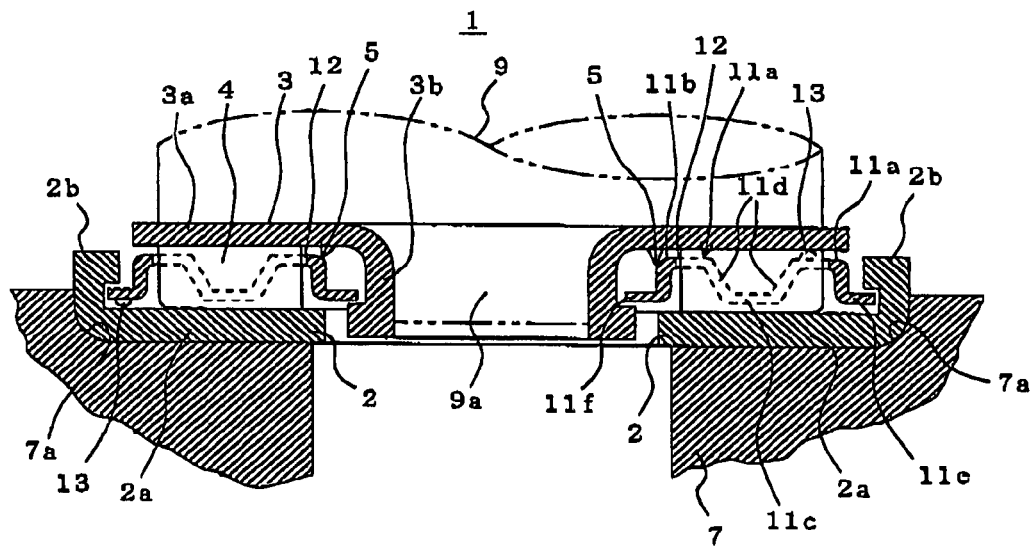
FIG. 1 is a vertical cross-sectional view showing a first embodiment of a thrust roller bearing of the present invention.
Figure 2:
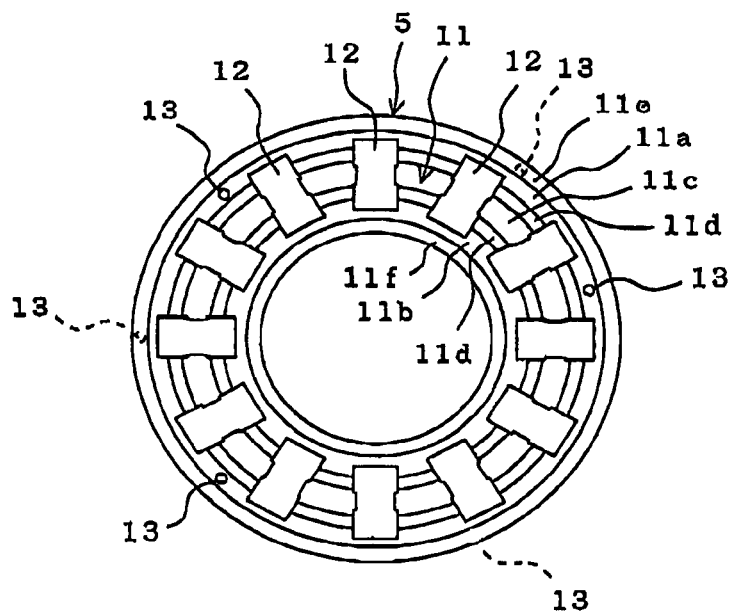
FIG. 2 is a plan view of a cage of the thrust roller bearing of FIG. 1.

FIG. 1 is a vertical cross-sectional view showing a first embodiment of a thrust roller bearing of the present invention, and FIG. 2 is a plan view of a cage of this thrust roller bearing.

As shown in FIG. 1, the thrust roller bearing 1 of this first embodiment includes a pair of first and second races 2 and 3 each having an annular shape, a plurality of needle rollers 4 disposed between the two races 2 and 3, and the cage 5 holding the needle rollers 4.

The first race 2 includes a body portion 2a formed by an annular thin plate, and an outer cylindrical portion 2b formed at an outer periphery of the body portion 2a and bent to extend toward the second race 3. The first race 2 is formed into an integral construction (that is, all of the portions of the first race 2 are formed integrally with each other), for example, by pressing a steel plate into a predetermined shape. The first race 2 is fitted in a counterbore portion 7a formed in a housing 7 which is a stationary member.

The second race 3 is formed generally in symmetrical relation to the first race 2, with the needle rollers 4 interposed therebetween. The second race 3 includes a body portion 3a formed by an annular thin plate, and an inner cylindrical portion 3b formed at an inner periphery of the body portion 3a and bent to extend toward the first race 2. The second race 3 is formed into an integral construction (that is, all of the portions of the second race 3 are formed integrally with each other), for example, by pressing a steel plate into a predetermined shape. A shaft convex portion 9a formed at an end of a shaft member 9 (which is to be borne by this thrust bearing) is fitted in a bore of the inner cylindrical portion 3b of the second race 3.

The cage 5 is formed from a single annular plate, and a bent portion 11 of a generally M-shape is formed at a radially-intermediate region thereof by drawing, the generally M-shaped bent portion 11 being bent in an axial direction. Thus, the cage 5 has the generally M-shaped bent portion 11, and with this construction the rigidity of the cage 5 is increased, and a large load capacity is secured while achieving a compact design of the thrust bearing.

The generally M-shaped bent portion 11 includes a U-shaped radially-outer projecting portion 11a and a U-shaped radially-inner projecting portion 11b which are formed respectively at radially-outward and radially-inward portions thereof and project a generally equal distance toward the second race 3 in a direction of the thickness of the cage 5, and further includes a U-shaped intermediate projecting portion 11c disposed between the two projecting portions 11a and 11b and projecting toward the first race 2 in the direction of the thickness of the cage 5, a first slanting portion 11d interconnecting the radially-outer projecting portion 11a and the intermediate projecting portion 11c, a second slanting portion 11d interconnecting the radially-inner projecting portion 11b and the intermediate projecting portion 11c, an outer peripheral horizontally-projecting portion 11e extending horizontally from an outer edge of the radially-outer projecting portion 11a, and an inner peripheral horizontally-projecting portion 11f extending horizontally from an inner edge of the radially-inner projecting portion 11b.

Further, three axially-projecting convex portions (projections) 13 are formed on a race-contacting surface of the radially-outer projecting portion 11a of the generally M-shaped bent portion 11 of the cage 5, and are arranged at predetermined intervals in the circumferential direction. Also, three axially-projecting convex portions 13 are formed on a race-contacting surface of the outer peripheral horizontally-projecting portion 11e of the generally M-shaped bent portion 11, and are arranged at predetermined intervals in the circumferential direction. These convex portions 13 can be easily formed by punching in the pressing process.

In the cage 5, a plurality of pockets 12 are formed in that portion of the generally M-shaped bent portion 11 lying between a region near to the outer edge of the radially-outer projecting portion 11a and a region near to the inner edge of the radially-inner projecting portion 11b, and are arranged at predetermined intervals in the circumferential direction. The pockets 12 are formed by stamping (blanked) out the relevant portions of the generally M-shaped bent portion 11 in the direction of the thickness of the cage 5, and each pocket 12 has a generally rectangular shape when viewed from the top. The needle rollers 4 are rotatably received respectively in the pockets 12 in such a manner as not to be disengaged therefrom.

When the needle rollers 4 are received respectively in the pockets 12 of the cage 5 of the above construction, and then the thrust roller bearing 1 is assembled in such a manner that the cage 5 is interposed between the first race 2 and the second race 3, an end portion of the outer cylindrical portion 2b of the first race 2 is disposed out of contact with the body portion 3a of the second race 3, and also an end portion of the inner cylindrical portion 3b of the second race 3 is disposed out of contact with the body portion 2a of the first race 2.

The needle rollers 4 received respectively in the pockets 12 of the cage 5 are arranged in such a manner that axes of these needle rollers 4 are disposed radially with respect to the axis of the shaft member 9, and peripheral surfaces of the needle rollers 4 are in contact with inner surfaces (serving as raceway surfaces) of the body portions 2a and 3a of the first and second races 2 and 3.

Therefore, the needle rollers 4 can support an axial load of the shaft portion 9 via the body portions 2a and 3a of the first and second races 2 and 3. In this condition, when the first and second races 2 and 3 rotate relative to each other, the needle rollers 4 rotate, so that a frictional resistance to the shaft member 9 can be reduced.

The three convex portions 13 formed on the race-contacting surface of the radially-outer projecting portion 11a of the cage 5 and arranged at the predetermined intervals in the circumferential direction abut against the inner surface (raceway surface) of the body portion 3a of the second race 3. Also, the three convex portions 13 formed on the race-contacting surface of the outer peripheral horizontally-projecting portion 11e of the cage 5 and arranged at the predetermined intervals in the circumferential direction abut against the inner surface (raceway surface) of the body portion 2a of the first race 2. The intermediate projecting portion 11c of the cage 5 is disposed near to the inner surface (raceway surface) of the body portion 2a of the first race 2, and the radially-inner projecting portion 11b of the cage 5 is disposed near to the inner surface (raceway surface) of the body portion 3a of the second race 3.

As described above, in the thrust roller bearing 1 of this first embodiment, the three axially-projecting convex portions 13 are formed on the race-contacting surface of each of the radially-outer projecting portion 11a and the outer peripheral horizontally-projecting portion 11e of the generally M-shaped bent portion 11 of the cage 5, and are arranged at the predetermined intervals in the circumferential direction. Therefore, when the thrust roller bearing is assembled in such a manner that the cage 5 having the needle rollers 4 received in the respective pockets 12 is interposed between the first and second races 2 and 3, the convex portions 13 formed on the radially-outer projecting portion 11a of the cage 5 abut against the inner surface (raceway surface) of the body portion 3a of the second race 3, while the convex portions 13 formed on the outer peripheral horizontally-projecting portion 11e of the cage 5 abut against the inner surface (raceway surface) of the body portion 2a of the first race 2, and the peripheral surfaces of the needle rollers 4 received in the respective pockets 12 of the cage 5 contact the inner surface of the body portion 2a of the first race 2 and the inner surface of the body portion 3a of the second race 3. Thus, the inner surfaces of the body portions 2a and 3a of the first and second races 2 and 3 do not fully contact the outer peripheral horizontally-projecting portion 11e and the radially-outer projecting portion 11a of the cage 5, respectively, and instead the three convex portions 13 on the radially-outer projecting portion 11a are merely disposed in point-contact with the second race 3, while the three convex portions 13 on the outer peripheral horizontally-projecting portion 11e are merely disposed in point-contact with the first race 2. Therefore, a shearing resistance due to the viscosity of oil between the cage 5 and the first and second races 2 and 3 is reduced, so that the rotation torque can be reduced.

In the above first embodiment, although the three convex portions 13 are formed on the race-contacting surface of each of the radially-outer projecting portion 11a and the outer peripheral horizontally-projecting portion 11e of the cage 5 from the standpoint of stability, a desired number of convex portions 13 can be formed in so far as this number is not smaller than three. Furthermore, although the three convex portions 13 are formed on the radially-outer projecting portion 11a of the cage 5, these three convex portions 13 may be formed on the radially-inner projecting portion 11b.

Second Embodiment

Figure 3:
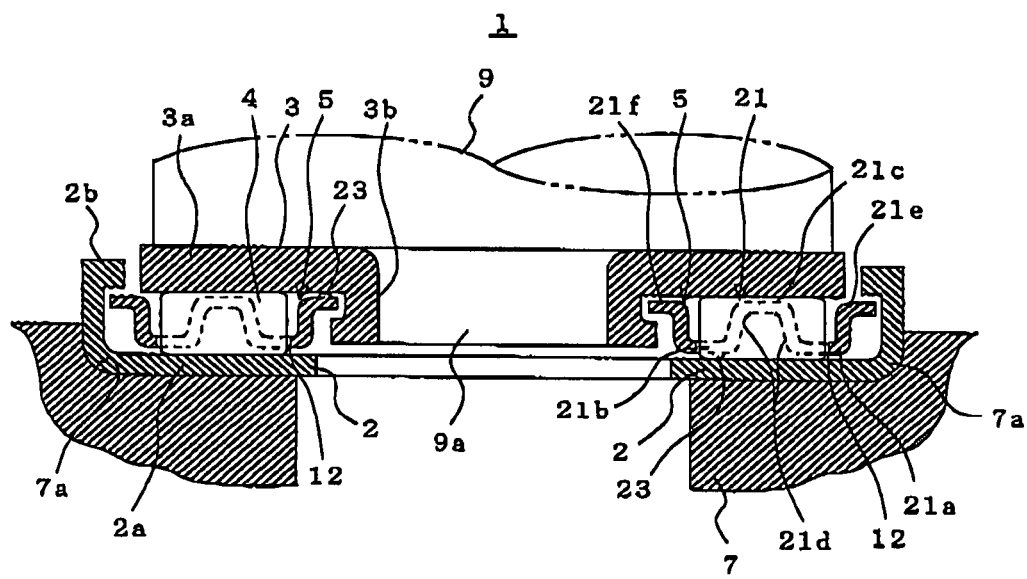
FIG. 3 is a vertical cross-sectional view showing a second embodiment of a thrust roller bearing of the invention.
Figure 4:
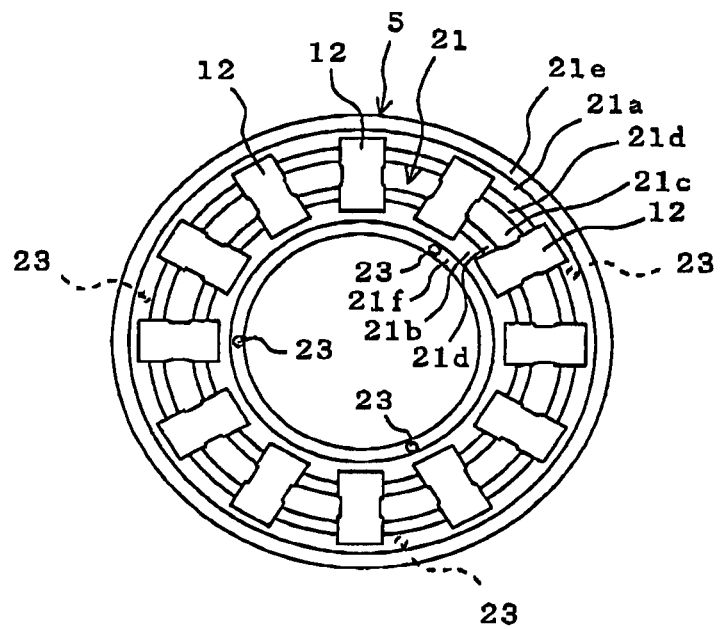
FIG. 4 is a plan view of a cage of the thrust roller bearing of FIG. 3.

FIG. 3 is a vertical cross-sectional view showing a second embodiment of a thrust roller bearing of the invention, and FIG. 4 is a plan view of a cage of this thrust roller bearing.

In this second embodiment, those constituent portions similar to those of the first embodiment will be designated by identical reference numerals, respectively, and explanation thereof will be omitted, and only different constituent portions will be described.

In the first embodiment, the convex portions 13 are formed on the radially-outer projecting portion 11a and the outer peripheral horizontally-projecting portion 11e of the generally M-shaped bent portion 11 of the cage 5. In the second embodiment, however, convex portions 23 are formed on a radially-inner projecting portion 21b and an inner peripheral horizontally-projecting portion 21f of a generally inverted M-shaped bent portion 21 of the cage 5.

The cage 5 of this second embodiment has the generally inverted M-shaped bent portion 21 bent in an axial direction. The generally inverted M-shaped bent portion 21 includes a U-shaped radially-outer projecting portion 21a and the U-shaped radially-inner projecting portion 21b which are formed respectively at radially-outward and radially-inward portions thereof and project a generally equal distance toward a first race 2 in a direction of the thickness of the cage 5, and further includes a U-shaped intermediate projecting portion 21c disposed between the two projecting portions 21a and 21b and projecting toward a second race 3 in the direction of the thickness of the cage 5, a first slanting portion 21d interconnecting the radially-outer projecting portion 21a and the intermediate projecting portion 21c, a second slanting portion 21d interconnecting the radially-inner projecting portion 21b and the intermediate projecting portion 21c, an outer peripheral horizontally-projecting portion 21e extending horizontally from an outer edge of the radially-outer projecting portion 21a, and the inner peripheral horizontally-projecting portion 21f extending horizontally from an inner edge of the radially-inner projecting portion 21b.

Further, the three axially-projecting convex portions (projections) 23 are formed on a race-contacting surface of the radially-inner projecting portion 21b of the generally inverted M-shaped bent portion 21 of the cage 5, and are arranged at predetermined intervals in the circumferential direction. Also, the three axially-projecting convex portions 23 are formed on a race-contacting surface of the inner peripheral horizontally-projecting portion 21f of the generally inverted M-shaped bent portion 21, and are arranged at predetermined intervals in the circumferential direction. These convex portions 13 can be easily formed by punching in a pressing process.

When needle rollers 4 are received respectively in pockets 12 of the cage 5 of the above construction, and then the thrust roller bearing 1 is assembled in such a manner that the cage 5 is interposed between the first race 2 and the second race 3, an end portion of an outer cylindrical portion 2b of the first race 2 is disposed out of contact with a body portion 3a of the second race 3, and also an end portion of an inner cylindrical portion 3b of the second race 3 is disposed out of contact with a body portion 2a of the first race 2.

The needle rollers 4 received respectively in the pockets 12 of the cage 5 are arranged in such a manner that axes of these needle rollers 4 are disposed radially with respect to an axis of a shaft member 9, and peripheral surfaces of needle rollers 4 are in contact with inner surfaces (serving as raceway surfaces) of the body portions 2a and 3a of the first and second races 2 and 3.

Therefore, the needle rollers 4 can support an axial load of the shaft portion via the body portions 2a and 3a of the first and second races 2 and 3. In this condition, when the first and second races 2 and 3 rotate relative to each other, the needle rollers 4 rotate, so that a frictional resistance to the shaft member 9 can be reduced.

The three convex portions 23 formed on the race-contacting surface of the radially-inner projecting portion 21b of the cage 5 and arranged at the predetermined intervals in the circumferential direction abut against the inner surface (raceway surface) of the body portion 2a of the first race 2. Also, the three convex portions 3 formed on the race-contacting surface of the inner peripheral horizontally-projecting portion 21f of the cage 5 and arranged at the predetermined intervals in the circumferential direction abut against the inner surface (raceway surface) of the body portion 3a of the second race 3. The intermediate projecting portion 21c of the cage 5 is disposed near to the inner surface (raceway surface) of the body portion 3a of the second race 3, and the radially-outer projecting portion 21a of the cage 5 is disposed near to the inner surface (raceway surface) of the body portion 2a of the first race 2.

As described above, in the thrust roller bearing 1 of this second embodiment, the three axially-projecting convex portions 23 are formed on the race-contacting surface of each of the radially-inner projecting portion 21b and the inner peripheral horizontally-projecting portion 21f of the generally inverted M-shaped bent portion 21 of the cage 5, and are arranged at the predetermined intervals in the circumferential direction. Therefore, when the thrust roller bearing is assembled in such a manner that the cage 5 having the needle rollers 4 received in the respective pockets 12 is interposed between the first and second races 2 and 3, the convex portions 23 formed on the race-contacting surface of the radially-inner projecting portion 21b of the cage 5 abut against the inner surface (raceway surface) of the body portion 2a of the first race 2, while the convex portions 23 formed on the race-contacting surface of the inner peripheral horizontally-projecting portion 21f of the cage 5 abut against the inner surface (raceway surface) of the body portion 3a of the second race 3, and the peripheral surfaces of the needle rollers 4 received in the respective pockets 12 of the cage 5 contact the inner surface of the body portion 2a of the first race 2 and the inner surface of the body portion 3a of the second race 3. Thus, the radially-inner projecting portion 21b of the cage 5 does not fully contact the body portion 2a of the first race 2, and also the inner peripheral horizontally-projecting portion 21f does not fully contact the body portion 3a of the second race 3, and instead the three convex portions 23 on the radially-inner projecting portion 21b are merely disposed in point-contact with the first race 2, while the three convex portions 23 on the inner peripheral horizontally-projecting portion 21f are merely disposed in point-contact with the second race 3. Therefore, a shearing resistance due to the viscosity of oil between the cage 5 and the first and second races 2 and 3 is reduced, so that a rotation torque can be reduced.

In the above second embodiment, although the three convex portions 23 are formed on the race-contacting surface of each of the radially-inner projecting portion 21b and the inner peripheral horizontally-projecting portion 21f of the cage 5 from the standpoint of stability, a desired number of convex portions 23 can be formed in so far as this number is not smaller than three.

Furthermore, although the three convex portions 23 are formed on the radially-inner projecting portion 21b of the cage 5, these three convex portions 23 may be formed on the radially-outer projecting portion 21a. Furthermore, although the three convex portions 23 are formed on the inner peripheral horizontally-projecting portion 21f of the cage 5, these three convex portions 23 may be formed on the intermediate projecting portion 21c.

Third Embodiment

Figure 5:
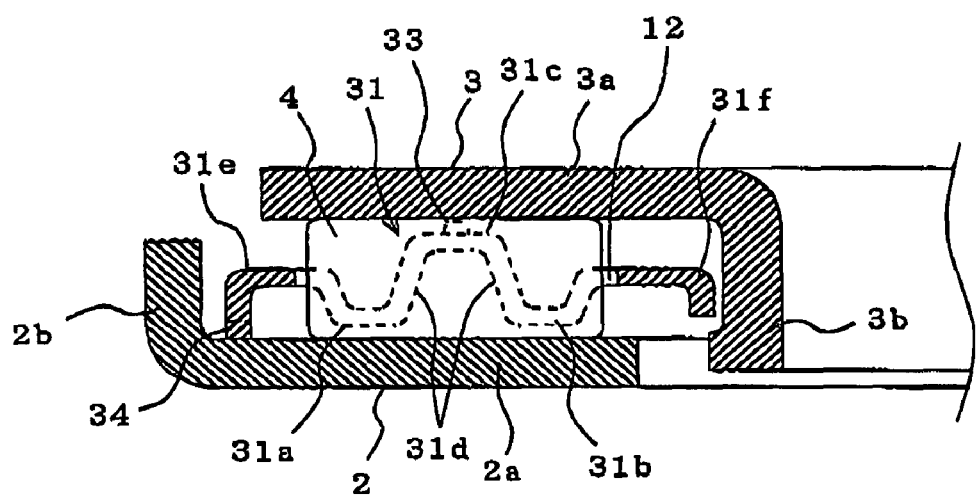
FIG. 5 is a vertical cross-sectional view showing an important portion of a third embodiment of a thrust roller bearing of the invention.

FIG. 5 is a vertical cross-sectional view showing an important portion of a third embodiment of a thrust roller bearing of the invention.

In this third embodiment, those constituent portions similar to those of the first embodiment will be designated by identical reference numerals, respectively, and explanation thereof will be omitted, and only different constituent portions will be described.

In the first embodiment, the convex portions 13 are formed on the radially-outer projecting portion 11a and the outer peripheral horizontally-projecting portion 11e of the generally M-shaped bent portion 11 of the cage 5. In the third embodiment, however, convex portions 33 are formed on an intermediate projecting portion 31c of a generally inverted M-shaped bent portion 31 of a cage 5, and protruding portions 34 are formed on an outer peripheral L-shaped projecting portion 31e of the bent portion 31.

The cage 5 of this third embodiment has the generally inverted M-shaped bent portion 31 bent in an axial direction. The generally inverted M-shaped bent portion 31 includes a U-shaped radially-outer projecting portion 31a and a U-shaped radially-inner projecting portion 31b which are formed respectively at radially-outward and radially-inward portions thereof and project a generally equal distance toward a first race 2 in a direction of the thickness of the cage 5, and further includes the U-shaped intermediate projecting portion 31c disposed between the two projecting portions 31a and 31b and projecting toward a second race 3 in the direction of the thickness of the cage 5, a first slanting portion 31d interconnecting the radially-outer projecting portion 31a and the intermediate projecting portion 31c, a second slanting portion 31d interconnecting the radially-inner projecting portion 31b and the intermediate projecting portion 31c, the outer peripheral L-shaped projecting portion 31e which first extends horizontally from an outer edge of the radially-outer projecting portion 31a and then is bent at right angles to extend toward the first race 2, and an inner peripheral L-shaped projecting portion 31f which first extend horizontally from an inner edge of the radially-inner projecting portion 31b and then is bent at right angles to extend toward the first race 2.

Further, the three axially-projecting convex portions (projections) 33 are formed on a race-contacting surface of the intermediate projecting portion 31c of the generally inverted M-shaped bent portion 31 of the cage 5, and are arranged at predetermined intervals in the circumferential direction. Also, the three axially-protruding portions 34 are formed on a race-contacting end (or edge) of the outer peripheral L-shaped projecting portion 31e of the generally inverted M-shaped bent portion 31, and are arranged at predetermined intervals in the circumferential direction. These protruding portions 34 are formed by notching the race-contacting end portion of the outer peripheral L-shaped projecting portion 31e at predetermined intervals in the circumferential direction, and those portions of the race-contacting end portion which are not notched serve as the protruding portions 34, respectively.

The three convex portions 33 formed on the race-contacting surface of the intermediate projecting portion 31c of the cage 5 and arranged at the predetermined intervals in the circumferential direction abut against an inner surface (raceway surface) of a body portion 3a of the second race 3. Also, the three protruding portions 34 formed on the race-contacting end of the outer peripheral L-shaped projecting portion 31e of the cage 5 and arranged at the predetermined intervals in the circumferential direction abut against an inner surface (raceway surface) of a body portion 2a of the first race 2. The radially-outer projecting portion 31a and the radially-inner projecting portion 31b of the cage 5 are disposed near to the inner surface (raceway surface) of the body portion 2a of the first race 2.

As described above, in the thrust roller bearing 1 of this third embodiment, the three convex portions 33 are formed on the race-contacting surface of the intermediate projecting portion 31c of the generally inverted M-shaped bent portion 31 of the cage 5, and are arranged at the predetermined intervals in the circumferential direction. Also, the three protruding portions 34 are formed on the race-contacting end of the outer peripheral L-shaped projecting portion 31e, and are arranged at the predetermined intervals in the circumferential direction. Therefore, when the thrust roller bearing is assembled in such a manner that the cage 5 having needle rollers 4 received in respective pockets 12 is interposed between the first and second races 2 and 3, the three convex portions 33 formed on the race-contacting surface of the intermediate projecting portion 31c of the cage 5 abut against the inner surface (raceway surface) of the body portion 3a of the second race 3, while the three protruding portions 34 formed on the race-contacting end of the outer peripheral L-shaped projecting portion 31e of the cage 5 abut against the inner surface (raceway surface) of the body portion 2a of the first race 2, and the peripheral surfaces of the needle rollers 4 received in the respective pockets 12 of the cage 5 contact the inner surface of the body portion 2a of the first race 2 and the inner surface of the body portion 3a of the second race 3. Thus, the intermediate projecting portion 31c and the outer peripheral L-shaped projecting portion 31e of the cage 5 do not fully contact the body portions 3a and 2a of the second and first races 3 and 2, respectively, and instead the three convex portions 33 are merely disposed in point-contact with the second race 3, while the three protruding portions 34 are merely disposed in point-contact with the first race 2. Therefore, a shearing resistance due to the viscosity of oil between the cage 5 and the first and second races 2 and 3 is reduced, so that a rotation torque can be reduced.

In the above third embodiment, from the standpoint of stability, the three convex portions 33 are formed on the race-contacting surface of the intermediate projecting portion 31c of the cage 5, while the three protruding portions 34 are formed on the race-contacting end of the outer peripheral L-shaped projecting portion 31e. However, a desired number of convex portions 33 as well as a desired number of protruding portions 34 as can be formed in so far as this number is not smaller than three.

Fourth Embodiment

Figure 6:
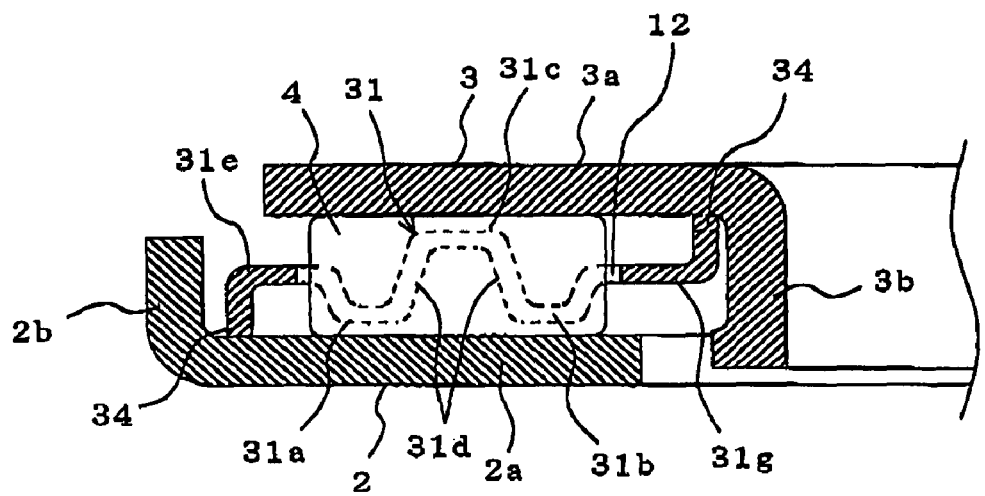
FIG. 6 is a vertical cross-sectional view showing an important portion of a fourth embodiment of a thrust roller bearing of the invention.

FIG. 6 is a vertical cross-sectional view showing an important portion of a fourth embodiment of a thrust roller bearing of the invention.

In this fourth embodiment, those constituent portions similar to those of the third embodiment will be designated by identical reference numerals, respectively, and explanation thereof will be omitted, and only different constituent portions will be described.

In the third embodiment, the convex portions 33 are formed on the intermediate projecting portion 31c of the generally inverted M-shaped bent portion 31 of the cage 5, and the protruding portions 34 are formed on the outer peripheral L-shaped projecting portion 31e. In the fourth embodiment, however, protruding portions 34 are formed on an outer peripheral L-shaped projecting portion 31e and an inner peripheral L-shaped projecting portion 31g of a generally inverted M-shaped bent portion 31 of a cage 5.

The cage 5 of this fourth embodiment has the generally inverted M-shaped bent portion 31 bent in an axial direction. The outer peripheral L-shaped projecting portion 31e of the generally M-shaped bent portion 31 first extends horizontally from an outer edge of a radially-outer projecting portion 31a and then is bent at right angles to extend toward a first race 2, while the inner peripheral L-shaped projecting portion 31g first extends horizontally from an inner edge of a radially-inner projecting portion 31b and then is bent at right angles to extend toward a second race 3.

The three axially-protruding portions 34 are formed on a race-contacting end (or edge) of the outer peripheral L-shaped projecting portion 31e, and are arranged at predetermined intervals in the circumferential direction. Similarly, the three axially-protruding portions 34 are formed on a race-contacting end (or edge) of the inner peripheral L-shaped projecting portion 31g, and are arranged at predetermined intervals in the circumferential direction. The protruding portions 34 are formed by notching the race-contacting end portion of each of the outer and inner peripheral L-shaped projecting portions 31e and 31g at predetermined intervals in the circumferential direction, and those portions of the race-contacting end portion which are not notched serve as the protruding portions 34, respectively.

In this fourth embodiment, the three protruding portions 34 formed on the race-contacting end of the outer peripheral L-shaped projecting portion 31e of the cage 5 and arranged at the predetermined intervals in the circumferential direction abut against an inner surface (raceway surface) of a body portion 2a of the second race 2. Also, the three protruding portions 34 formed on the race-contacting end of the inner peripheral L-shaped projecting portion 31g of the cage 5 and arranged at the predetermined intervals in the circumferential direction abut against an inner surface (raceway surface) of a body portion 3a of the second race 3. An intermediate projecting portion 31c of the cage 5 is disposed near to the inner surface (raceway surface) of the body portion 3a of the second race 3, and the radially-outer projecting portion 31a and the radially-inner projecting portion 31b of the cage 5 are disposed near to the inner surface (raceway surface) of the body portion 2a of the first race 2.

As described above, in the thrust roller bearing 1 of this fourth embodiment, the three protruding portions 34 are formed on the race-contacting end of each of the outer peripheral L-shaped projecting portion 31e and the inner peripheral L-shaped projecting portion 31g of the generally inverted M-shaped bent portion 31 of the cage 5, and are arranged at the predetermined intervals in the circumferential direction. Therefore, when the thrust roller bearing is assembled in such a manner that the cage 5 having needle rollers 4 received in respective pockets 12 is interposed between the first and second races 2 and 3, the three protruding portions 34 formed on the outer peripheral L-shaped projecting portion 31e of the cage 5 abut against the inner surface (raceway surface) of the body portion 2a of the first race 2, while the three protruding portions 34 formed on the inner peripheral L-shaped projecting portion 31g of the cage 5 abut against the inner surface (raceway surface) of the body portion 3a of the second race 3, and the peripheral surfaces of the needle rollers 4 received in the respective pockets 12 of the cage 5 contact the inner surface of the body portion 2a of the first race 2 and the inner surface of the body portion 3a of the second race 3. Thus, the outer peripheral L-shaped projecting portion 31e and the inner peripheral L-shaped projecting portion 31g of the cage 5 do not fully contact the inner surfaces of the body portions 2a and 3a of the first and second races 2 and 3, respectively, and instead the three protruding portions 34 on the outer peripheral L-shaped projecting portion 31e are merely disposed in point-contact with the first race 2, while the three protruding portions 34 on the inner peripheral L-shaped projecting portion 31g are merely disposed in point-contact with the second race 3. Therefore, a shearing resistance due to the viscosity of oil between the cage 5 and the first and second races 2 and 3 is reduced, so that a rotation torque can be reduced.

In the above fourth embodiment, although the three protruding portions 34 are formed on the race-contacting end of each of the outer and inner peripheral L-shaped projecting portions 31e and 31g from the standpoint of stability, a desired number of protruding portions 34 can be formed in so far as this number is not smaller than three.

Figure 6A:
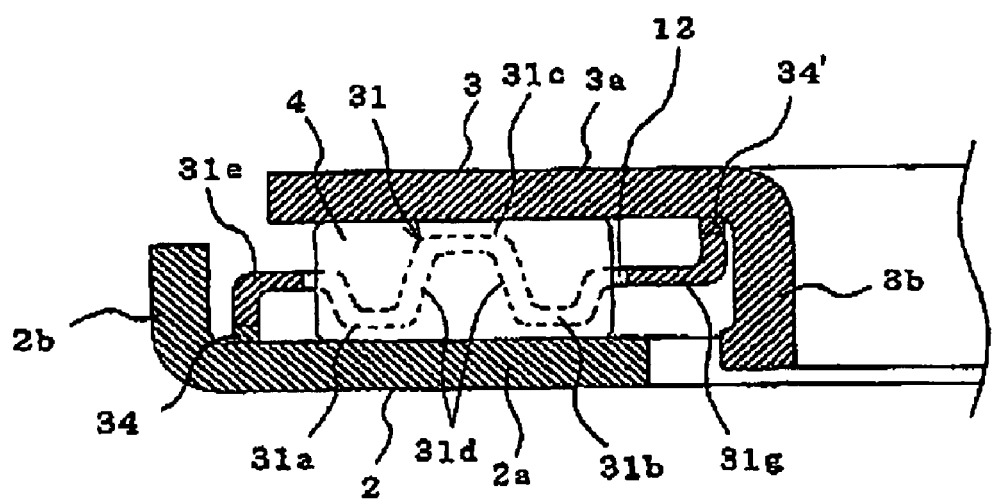

A modification of the fourth embodiment is shown in FIG. 6A. In this modification, cage-contacting projection portions 34', which correspond to the protruding portions 34 of the fourth embodiment, are arranged on the raceway surfaces of the body portions 2a, 3a of the first race 2 and the second race 3 as shown in FIG. 6A. The cage-contacting projection portions 34' abut against the outer peripheral L-shaped projecting portion 31e and the inner peripheral L-shaped projecting portion 31g of the cage 5, respectively. The cage-contacting projection portions 34' are arranged at predetermined intervals in the circumferential direction.

Fifth Embodiment

Figure 7:
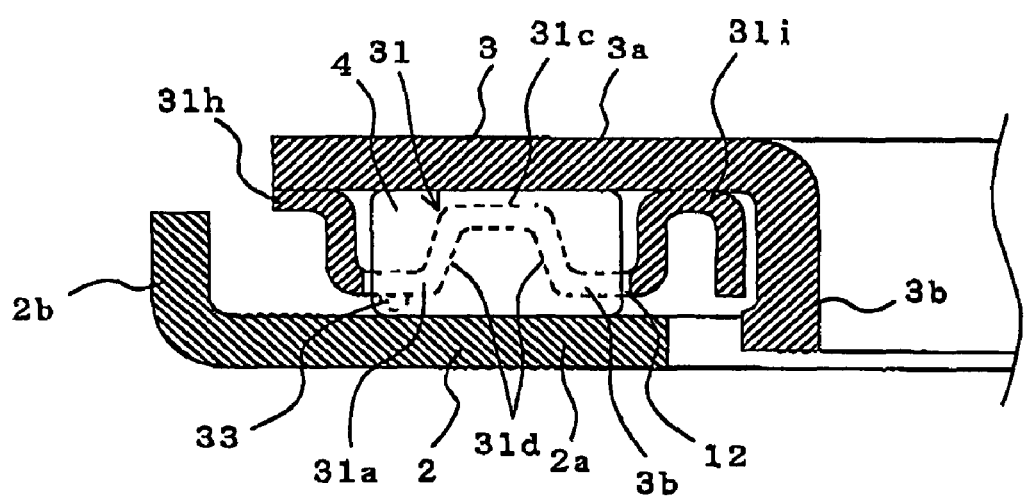
FIG. 7 is a vertical cross-sectional view showing an important portion of a fifth embodiment of a thrust roller bearing of the invention.

FIG. 7 is a vertical cross-sectional view showing an important portion of a fifth embodiment of a thrust roller bearing of the invention.

In this fifth embodiment, those constituent portions similar to those of the third embodiment will be designated by identical reference numerals, respectively, and explanation thereof will be omitted, and only different constituent portions will be described.

In the third embodiment, the convex portions 33 are formed on the intermediate projecting portion 31c of the generally inverted M-shaped bent portion 31 of the cage 5, and the protruding portions 34 are formed on the outer peripheral L-shaped projecting portion 31e. In the fifth embodiment, however, an outer peripheral horizontally-projecting portion 31h and an inner peripheral inverted U-shaped projecting portion 31i of a generally inverted M-shaped bent portion 31 are projected in an amount larger than the amount of projecting of an intermediate projecting portion 31c, and therefore are disposed in stepped relation thereto, and three convex portions 33 are formed on a race-contacting surface of a radially-outer projecting portion 31a, and are arranged at predetermined intervals in a circumferential direction.

In this fifth embodiment, the outer peripheral horizontally-projecting portion 31h and the inner peripheral inverted U-shaped portion 31i of the cage 5 abut against an inner surface (raceway surface) of a body portion 3a of a second race 3, and the three convex portions 33 formed on the race-contacting surface of the radially-outer projecting portion 31a abut against an inner surface (raceway surface) of a body portion 2a of a first race 2. The intermediate projecting portion 31c of the cage 5 is disposed near to the inner surface (raceway surface) of the body portion 3a of the second race 3, and a radially-inner projecting portion 31b of the cage 5 is disposed near to the inner surface (raceway surface) of the body portion 2a of the first race 2.

As described above, in the thrust roller bearing 1 of this fifth embodiment, the outer peripheral horizontally-projecting portion 31h and the inner peripheral inverted U-shaped projecting portion 31i of the generally inverted M-shaped bent portion 31 of the cage 5 are projected in an amount larger than the amount of projecting of the intermediate projecting portion 31c, and therefore are disposed in stepped relation thereto, and the three convex portions 33 are formed on the race-contacting surface of the radially-outer projecting portion 31a, and are arranged at the predetermined intervals in the circumferential direction. Therefore, when the thrust roller bearing is assembled in such a manner that the cage 5 having needle rollers 4 received in respective pockets 12 is interposed between the first and second races 2 and 3, the outer peripheral horizontally-projecting portion 31h and the inner peripheral inverted U-shaped portion 31i of the cage 5 abut against the inner surface (raceway surface) of the body portion 3a of the second race 3, and the three convex portions 33 formed on the race-contacting surface of the radially-outer projecting portion 31a abut against the inner surface (raceway surface) of the body portion 2a of the first race 2, and the peripheral surfaces of the needle rollers 4 received in the respective pockets 12 of the cage 5 contact the inner surface of the body portion 2a of the first race 2 and the inner surface of the body portion 3a of the second race 3. Thus, only the race-contacting surfaces of the outer peripheral horizontally-projecting portion 31h and inner peripheral inverted U-shaped projecting portion 31i of the cage 5 contact the second race 3, and the radially-outer projecting portion 31a of the cage 5 does not fully contact the body portion 2a of the first race 2. Therefore, a shearing resistance due to the viscosity of oil between the cage 5 and the first and second races 2 and 3 is reduced, so that a rotation torque can be reduced.

In the above first to fourth embodiments, although the convex portions 13, 23, 33 or the protruding portions 34 are formed on both of the oppositely-projecting portions of the cage 5, the convex portions 13, 23, 33 or the protruding portions 34 may be formed on one of the oppositely-projecting portions. Furthermore, although the convex portions 13, 23, 33 or the protruding portions 34 are formed only on the cage 5, such convex portions or protruding portions may be formed on one or both of the first and second races 2 and 3, in which case the convex portions or the protruding portions are formed on those regions other than roller-rolling surfaces.

What is claimed is:

1. A thrust roller bearing comprising:
a pair of races each of which comprises an annular plate;
a cage interposed between the pair of races, formed by a single annular plate including a bent portion bent in an intermediate region in a radial direction of the cage such that a plurality of projecting portions to project in a thickness direction of the cage are formed on a first side and a second side of the cage, and a plurality of pockets stamped out in the thickness direction at predetermined intervals in a circumferential direction of the cage; and
a plurality of rollers received respectively in the pockets;
wherein at least two projecting portions of the plurality of projecting portions are formed on each of the first side and the second side of the cage; and
wherein a plurality of race-contacting projection portions extending in an axial direction are arranged on a surface of at least one of said at least two projecting portions on at least one of the first side and the second side of the cage at predetermined intervals in the circumferential direction of the cage.

2. A thrust roller bearing according to claim 1, wherein the plurality of race-contacting projection portions comprise convex portions formed by a punching part of the projecting portion or protruding portions formed by a notching part of an end portion of the projecting portion.

3. A thrust roller bearing according to claim 1, wherein one of said at least two projecting portions of the bent portion on said one of the first side and the second side of the cage, is projected in an amount greater than the amount of projecting of an other projecting portion of said at least two projecting portions in stepped relation thereto to provide a race-contacting projection portion.

4. A thrust roller bearing according to claim 1, wherein the plurality of race-contacting projection portions contact an outer surface, on a plane on which the plurality of rollers contact, of at least one of the pair of races.

5. A thrust roller bearing according to claim 1, wherein the plurality of race-contacting projection portions are arranged on a surface of at least one of said two projecting portions on the first side of the cage at predetermined intervals in the circumferential direction of the cage and are arranged on a surface of at least one of said two projecting portions on the second side of the cage at predetermined intervals in the circumferential direction of the cage.

6. A thrust roller bearing according to claim 1, wherein a portion of the plurality of race-contacting projection portions are arranged on an axial inner side of the cage, in relation to a path through which an axial center of the plurality of rollers pass, and another portion of the plurality of race-contacting projection portions are arranged on an axial outer side of the cage, in relation to the path through which the axial center of the plurality of rollers pass.

7. A thrust roller bearing according to claim 1, wherein a portion of the plurality of race-contacting projection portions are arranged on a radially inner side of the cage, in relation to a path through which a radial center of the plurality of rollers pass, and another portion of the plurality of race-contacting projection portions are arranged on a radially outer side of the cage, in relation to the path through which the radial center of the plurality of rollers pass.

8. A thrust roller bearing comprising:
a pair of races each of which comprises an annular plate;
a cage interposed between the pair of races, formed by a single annular plate including a bent portion bent in an intermediate region in a radial direction of the cage such that a plurality of projecting portions to project in a thickness direction of the cage are formed on a first side and a second side of the cage, and a plurality of pockets stamped out in the thickness direction at predetermined intervals in a circumferential direction of the cage; and
a plurality of rollers received respectively In the pockets;
wherein at least two projecting portions of the plurality of projecting portions are formed on each of the first side and the second side of the cage; and
wherein a plurality of cage-contacting projection portions extending in an axial direction are arranged on a surface of at least one of said pair of races at predetermined intervals along a circumferential direction of the races.

9. A thrust roller bearing according to claim 8, wherein the cage-contacting projection portions comprises convex portions.

* * * * *